No. 872,961. PATENTED DEC. 3, 1907.
P. NEDDO.
SCOOP.
APPLICATION FILED MAR. 28, 1907.
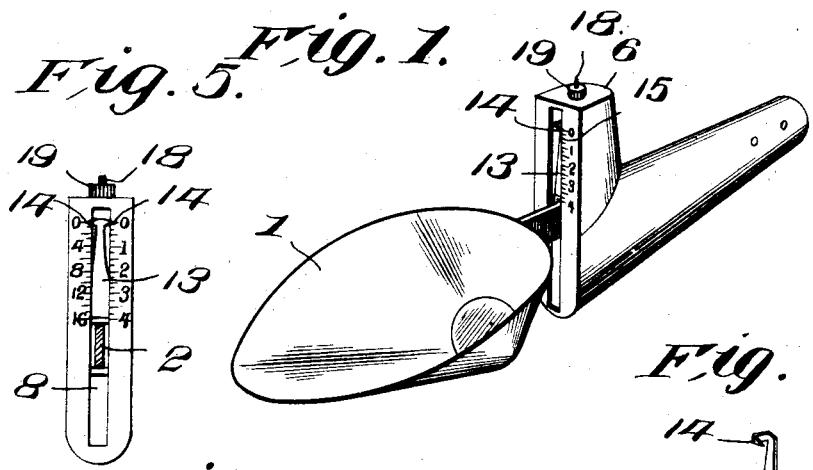
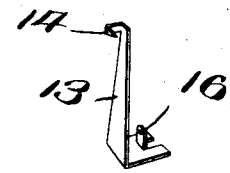
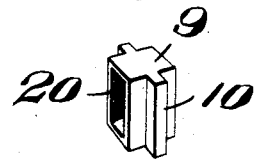
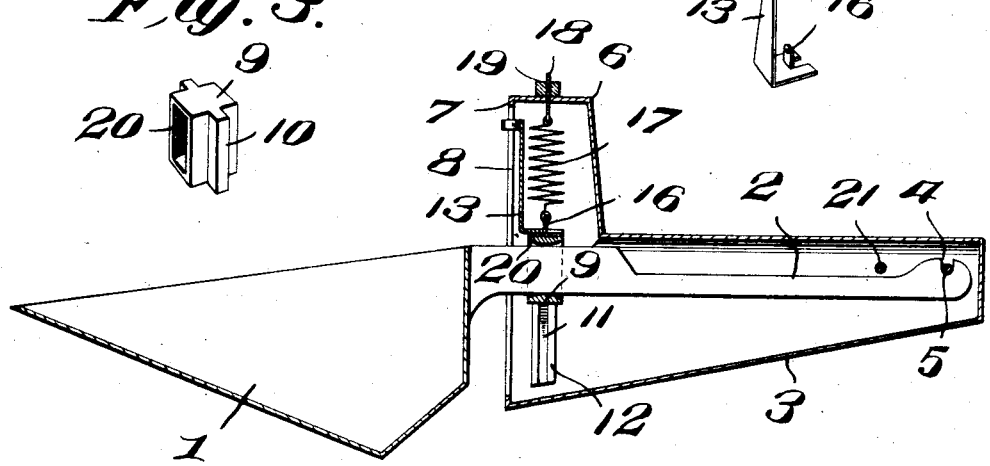
WITNESSES:
INVENTOR
P. Neddo
BY
W. J. FitzGerald
Attorneys

UNITED STATES PATENT OFFICE.

PHILIP NEDDO, OF BARRE, VERMONT.

SCOOP.

No. 872,961.     Specification of Letters Patent.     Patented Dec. 3, 1907.

Application filed March 28, 1907. Serial No. 365,204.

*To all whom it may concern:*

Be it known that I, PHILIP NEDDO, a citizen of the United States, residing at Barre, in the county of Washington and State of Vermont, have invented certain new and useful Improvements in Scoops; and I do hereby declare the following to be a full, clear, and exact description of the invention, such as will enable others skilled in the art to which it appertains to make and use the same.

My invention relates to new and useful improvements in scoops and more particularly to that class adapted to be used in groceries, households and like places for removing small quantities of various articles from bins, barrels and like receptacles and my object is to provide suitable devices in connection with the scoop whereby the weight of the contents of the scoop may be readily ascertained without requiring the use of a separate pair of scales.

A further object is to provide means for making the scoop interchangeable with the handle and weighing devices whereby the size of the scoop may be varied, and a still further object is to provide means for regulating parts of the weighing device to compensate for the increased or decreased weight of the scoop whereby the indicator will always register at zero when the scoop is empty.

Other objects and advantages will be hereinafter referred to and more particularly pointed out in the claims.

In the accompanying drawings which are made a part of this application, Figure 1 is a perspective view of my improved scoop complete. Fig. 2 is a longitudinal vertical central sectional view through the scoop and handle and showing my improved weighing attachment secured thereto. Fig. 3 is a detail perspective view of the scoop supporting portion of the scale, Fig. 4 is a detail perspective view of the indicator employed in connection with my improved weighing appliance and, Fig. 5 is an elevation of the forward end of the handle with the scoop broken away.

Referring to the drawings in which similar reference numerals designate corresponding parts throughout the several views, 1 indicates a scoop which may be of the usual or any preferred form and such as is commonly used by grocers, and others, for conveying loose articles from a bin or barrel to a suitable receptacle such as a bag or the like to receive the article and 2 indicates a rearwardly extending shank which is secured to the scoop in any preferred manner.

The shank 2 is adapted to be entered into a tubular handle 3 and extends therein to a point adjacent the rear end of the handle, the free end of the shank being provided with a notch 4 which engages a shaft 5 extending laterally through the handle section 3 and forms a pivotal bearing for the shank. The forward end of the tubular handle 3 is provided with a dome-like projection 6, the forward face of which is flattened and is covered with a plate 7 through the longitudinal center of which is formed an elongated slot 8 through which the shank 2 is entered into the tubular handle 3, the plate 7 being of sufficient length to extend from the upper end of the dome to the lower edge of the tubular handle.

In order to support the scoop and cause the shank to pivot on the shaft 5, I provide a hanger 9 which is provided on each outer face with ribs 10 which are adapted to enter vertically disposed channels 11 in guides 12, said guides being secured to the inner walls of the tubular handle 3 so that said hanger will be caused to move in a vertical position. A standard 13 is secured in any preferred manner and preferably by soldering, to the upper end of the hanger 9 and extends a distance above the hanger and is provided at its extreme upper end with an L-shaped finger 14. The finger 14 is so arranged that it extends through the slot 8 in the plate 7 and over a portion of the outer face of said plate and is adapted to register with graduation marks 15, said graduations being arranged to indicate pounds and fractions thereof.

That portion of the standard 13 secured to the hanger 9 is provided with an upwardly extending ear 16 to which is secured one end of a coiled tension spring 17, the opposite end of said spring being secured to an eye-bolt 18 which extends through the crown of the dome 6 and is exteriorly threaded to receive an adjusting nut 19 and by this construction it will readily be seen that the tension of the spring may be readily increased or decreased to accommodate a heavier or lighter scoop thereby enabling the operator to keep the finger 14 at "zero" when the scoop is empty, that is to say, when a heavier scoop is inserted into the tubular handle 3, the increased weight thereof will lower the finger 14 along the graduations and in order to balance the scale the nut 19 is rotated to elevate the eye-bolt which will result in increasing the tension of the spring 17 and elevate the hanger and free end of the scoop until the finger again registers with "zero." The hanger 9 is provided with a cavity 20 through which the shank 2 is extended and the upper and lower faces of the cavity are curved so that the hanger may freely move upwardly and downwardly without binding on the shank 2.

As best shown in Fig. 2 of the drawing I provide an auxiliary shaft 21 which extends laterally through the handle 3 in the same horizontal plane as the shaft 5 but is spaced a distance from the shaft 5 and toward the open end of the handle 3 and it will be readily seen that by engaging the notch 4 with the auxiliary shaft 21 that the leverage will be changed and the tension of the scoop upon the scales made lighter and by placing the proper graduations upon the opposite edge of the plate 7 from that occupied by the graduation marks 15 and providing a finger to extend over the same, as clearly shown in Fig. 5 a scale for weighing ounces and fractions thereof will be provided.

In operation the tubular handle 3 is grasped in the hand of the operator and the scoop inserted into a bin or other receptacle holding a quantity of the product to be weighed and thereby filling the scoop and in order to obtain the required amount, a portion of the product is removed until the finger registers the weight of the amount desired when the product may be placed directly into a suitable receptacle thereby obviating the necessity of conveying the product in the scoop to a scale, which, if there was an oversupply of the material in the scoop, would require a return trip of the operator to replace the oversupply to the bin.

It will therefore be seen that I have provided a very cheap and economical means for weighing a variety of articles of different weights and bulks and one that can be readily adjusted to accommodate different sized scoops and one wherein the tension upon the scales may be varied to obtain the weight of fractional ounces.

What I claim is:

1. The combination with a scoop having a shank; of a handle to receive said shank, shafts in said handle adapted to form pivotal points for said shank and means in the handle to weigh the contents of the scoop.

2. The combination with a scoop having a shank thereon and a notch in the free end of said shank; of a handle, shafts in said handle adapted to be engaged by said notch and form pivotal points for said shank, a hanger for said shank and yielding means to support said hanger whereby the contents of said scoop may be weighed.

3. The combination with a scoop having a shank; of a handle having a slot in one end thereof through which said shank extends, means to pivotally and removably secure the shank in the handle, a hanger, slidably mounted in said handle to receive said shank, a spring to support said hanger and a finger carried by said hanger and adapted to extend through the slot and over graduations to indicate the weight of the contents of the scoop.

4. The combination with a scoop having a shank thereon a tubular handle for said shank, means to pivotally and removably secure said shank in the handle, a plate at one end of said handle having a slot therein through which said shank extends, a hanger slidably mounted in said handle and having a cavity to receive said shank, a spring secured at one end to said hanger, means at the opposite end of said spring to anchor the same and adjust the tension thereof and a finger carried by said hanger and adapted to extend over graduations on said plate whereby the weight of the contents of the scoop will be indicated.

5. The combination with a scoop having a shank thereon; of a hollow handle, a dome at one end of said handle, a plate on said handle and dome having a slot therein through which said shank extends, a hanger slidably mounted in said handle and having a cavity therein to receive said shank, a spring secured at one end to said hanger, a bolt for the opposite end of said spring, said bolt being directed through the crown of said dome, an adjusting nut for said bolt whereby the tension of said spring may be varied, a finger carried by said hanger adapted to extend through said slot and over graduations on said plate and means to vary the tension upon the scales.

In testimony whereof I have signed my name to this specification in the presence of two subscribing witnesses.

PHILIP NEDDO.

Witnesses:
ALBERT A. SARGENT,
GEORGE GUMLAU.